(No Model.)
T. L. DAVIS.
WEEDER.
No. 472,749.　　　　　　　　　　Patented Apr. 12, 1892.
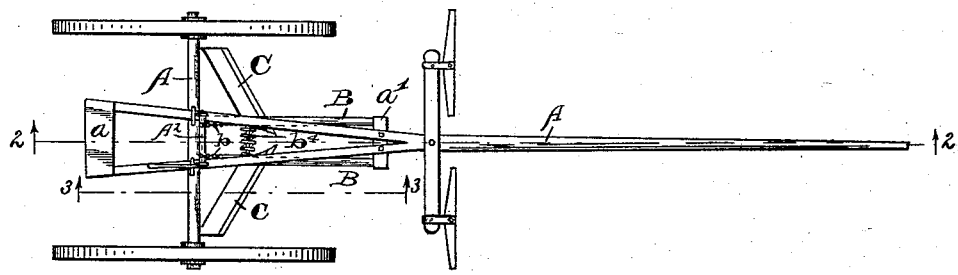
Fig. 1.
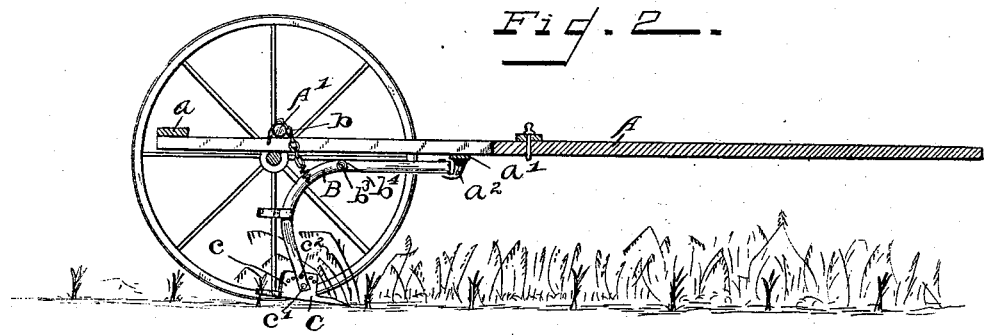
Fig. 2.
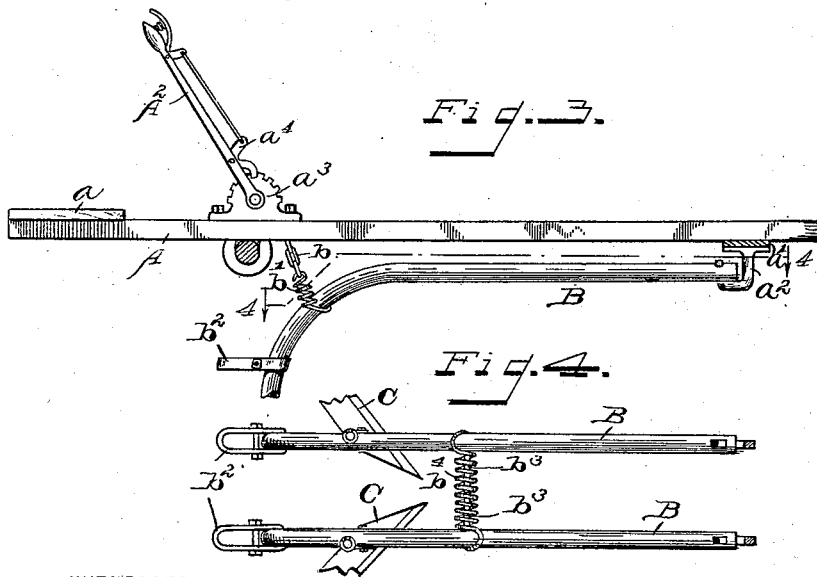
Fig. 3.
Fig. 4.
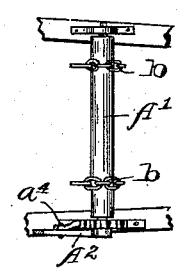
Fig. 5.
WITNESSES:
F. W. Warner.
J. A. Walsh.
INVENTOR
Thomas L. Davis,
per C. & E. W. Bradford,
ATTORNEYS.

UNITED STATES PATENT OFFICE.

THOMAS L. DAVIS, OF AZALIA, INDIANA.

WEEDER.

SPECIFICATION forming part of Letters Patent No. 472,749, dated April 12, 1892.

Application filed January 18, 1892. Serial No. 418,393. (No model.)

*To all whom it may concern:*

Be it known that I, THOMAS L. DAVIS, a citizen of the United States, residing at Azalia, in the county of Bartholomew and State of Indiana, have invented certain new and useful Improvements in Weeders, of which the following is a specification.

It frequently happens, especially in low marshy lands, that because of overflows or other reasons the ground is rendered unfit to plow or cultivate with the usual implements until the weeds and grasses have attained such headway as to become a serious injury to the plants—such as corn, rice, cotton, &c.—which may have been planted therein. The object of my said invention is to provide an implement whereby such weeds may be destroyed even while the ground is in such condition, as will be hereinafter more fully described and claimed.

Referring to the accompanying drawings, which are made a part hereof, and on which similar letters of reference indicate similar parts, Figure 1 is a top or plan view of my improved weeder; Fig. 2, a central longitudinal section through the same, as seen when looking in the direction indicated by the arrows from the dotted line 2 2 in Fig. 1; Fig. 3, a detail view on an enlarged scale, as seen when looking in the direction indicated by the arrows from the dotted lines 3 3 in Fig. 1; Fig. 4, a detail view, as seen when looking in the direction indicated by the arrows from the dotted line 4 4 in Fig. 3; and Fig. 5, a detail view of the adjusting device.

In said drawings, the portions marked A represent the frame, B the beams supporting the cutters, and C said cutters.

The frame A consists of a suitable axle supported by a pair of wheels, and a tongue secured thereto having double trees, thereon by which a team can be attached for drawing the implement. The rear portion of the tongue is shown as forked, with the two parts extending some distance behind the axle, and provided with a seat $a$ in the form of a wide cross-bar at their rear ends.

The beams B are connected at their front ends to a short cross-bar $a'$, attached to the under side of the tongue by a pivotal connection, which, as shown, consists of a hook-shaped device $a^2$, secured to the under side of said cross-piece, the upwardly-turned portion of which is inserted in a perforation in the end of said beam, the connection being sufficiently loose to permit said beams to be raised vertically when desired. Any other pivotal connection found suitable may, however, be substituted. The rear ends of said beams curve downwardly and extend to an appropriate position in relation to the ground for properly supporting the cutters. The roller $A'$ is journaled on the top of the frame and provided with a lever $A^2$ on one of its journals by which it may be operated, a rack $a^3$ being secured on the frame, and a spring-pawl $a^4$ on said lever, by which said roller is held in the desired adjustment. Each of said beams B is connected to said roll by means of a chain $b$ or other suitable connection, which preferably has a spring portion $b'$, as shown. A handle or clip $b^2$ is also secured on each of said beams in a position conveniently within reach of the feet of the operator sitting upon the seat $a$. Said beams preferably extend substantially parallel with each other, and are prevented from coming too close together by means of inwardly-projecting pins $b^3$, inserted in the adjacent faces of said beams in position so that their inner ends will abut when brought together, a spring $b^4$ being coiled around said pins, thus operating to normally hold said beams in a fixed relative position, but permitting them or either of them to be swung laterally when desired.

The cutters C consist of sharp-edged narrow blades secured to the lower ends of the beams and arranged with their cutting-edges on an angle extending back from their points, which are preferably formed tapered, as shown. Each of said cutters is formed with an upwardly-turned flange $c$, which is secured to the lower end of the beam by means of a bolt $c'$ and a break-pin $c^2$, said break-pin $c^2$ being adapted to be inserted in either one of a series of holes in said flange $c$ above said bolt $c'$, whereby the desired pitch or inclination is secured to said cutter. Said break-pin is formed of wood or similar material, which will break in the event a hard substance is struck and permit said cutter to turn without being broken.

The operation of my said invention is as follows: The operator, sitting upon the seat $a$ with his feet upon the clips or handles $b^2$, is enabled to adjust the cutters as desired and press them to the ground with the necessary force. Thus if a plant is out of line and in the normal path of the cutter, by pressing to one side said cutter is swung around the plant without injuring it, it being thus possible to adjust said cutters so that they will normally cut very close to the plants, as by the exercise of a little care the operator can avoid injuring those which are not exactly in line. By pressing down or lifting up on the handles the cutters are forced into or lifted out of the ground, as desired, it being intended to merely cut the weeds just below the surface and not cut to any considerable depth. By adjusting the pitch of the cutters the depth of the cut may be easily regulated. When obstructions are met, or for any reason it is desired to raise the cutters free from the ground, this can be readily accomplished by pulling back on the lever $A^2$, which turns the roll $A'$ and winds up the chain $b$, lifting said beams and cutters, as will be readily understood.

This construction of weeder may be used on ground too soft to permit of plowing, as the cutters are narrow and the weeds and little soil cut under simply ride over them without disturbing the soil to any great extent.

It will be understood, of course, that the construction of the frame is immaterial and that frames similar to ordinary cultivator-frames might be employed, and that in lieu of the handles $b^2$ longer handles convenient to be used by the hands might be substituted. This will be found desirable when the operator wishes to walk behind the weeder instead of ride.

Having thus fully described my said invention, what I claim as new, and desire to secure by Letters Patent, is—

1. In a weeder, the combination of the frame, the beams B, pivoted thereto to swing laterally and also to permit of vertical adjustment, the roller $A'$, connected with said beams by ropes or chains, the lever $A^2$, with a rack and pawl for operating and holding said roller, the narrow sharp-edged blades C, secured to the lower ends of said beams B by means of a pivot-bolt $c'$, which passes through a perforation in said beam and in an upturned flange on said cutters, said cutters being held at the desired pitch or inclination by a pin $c^2$, which passes through another perforation in said beam and one of a series of perforations in said upturned flange of the cutter, said beams being also provided with handles $b^2$ for convenience in guiding and operating said cutters, all substantially as described, and for the purposes specified.

2. In a weeder, the combination of the frame, the beams B, pivoted at their forward ends thereto, the inwardly-projecting pins $b^3$, secured in the adjacent sides of each and arranged to abut, the spring $b^4$, surrounding said pins and connected at its ends to said beams, the cutters on the lower end of said beams, and handles connected to said beams for adjusting them, substantially as set forth.

In witness whereof I have hereunto set my hand and seal, at Azalia, Indiana, this 8th day of January, A. D. 1892.

THOMAS L. DAVIS. [L. S.]

Witnesses:
    JOEL NEWSOM,
    OSCAR L. NEWSOM.